(12) United States Patent
Green et al.

(10) Patent No.: US 9,495,336 B2
(45) Date of Patent: Nov. 15, 2016

(54) METHOD AND APPARATUS FOR COMPARING PROCESS DESIGNS

(75) Inventors: Barrie R. Green, Letchworth (GB); Leonard D. Greenwood, Beds (GB)

(73) Assignee: International Business Machines Corporation, Armonk, NY (US)

( * ) Notice: Subject to any disclaimer, the term of this patent is extended or adjusted under 35 U.S.C. 154(b) by 606 days.

(21) Appl. No.: 12/373,721

(22) PCT Filed: Jul. 3, 2007

(86) PCT No.: PCT/EP2007/056681
§ 371 (c)(1),
(2), (4) Date: Jan. 13, 2009

(87) PCT Pub. No.: WO2008/009550
PCT Pub. Date: Jan. 24, 2008

(65) Prior Publication Data
US 2009/0313308 A1 Dec. 17, 2009

(30) Foreign Application Priority Data
Jul. 19, 2006 (GB) .................................. 0614277.2

(51) Int. Cl.
*G06F 17/30* (2006.01)
*G06F 17/22* (2006.01)

(52) U.S. Cl.
CPC ....... *G06F 17/2211* (2013.01); *G06F 17/2288* (2013.01)

(58) Field of Classification Search
CPC .............. G06F 17/24; G06F 17/2235; G06F 17/30882; G06F 17/218; G06F 17/211
USPC .................................................. 707/758, 684
See application file for complete search history.

(56) References Cited

U.S. PATENT DOCUMENTS

| | | | |
|---|---|---|---|
| 2002/0002567 A1* | 1/2002 | Kanie et al. ................... | 707/513 |
| 2002/0163544 A1* | 11/2002 | Baker et al. ................... | 345/835 |
| 2002/0169826 A1* | 11/2002 | Yano .................... | H04L 12/1822 |
| | | | 709/203 |
| 2004/0073705 A1* | 4/2004 | Madril et al. ................. | 709/245 |
| 2004/0205653 A1* | 10/2004 | Hadfield et al. .............. | 715/530 |
| 2006/0069986 A1* | 3/2006 | Sandoval ...................... | 715/517 |

* cited by examiner

*Primary Examiner* — James Trujillo
*Assistant Examiner* — Fatima Mina
(74) *Attorney, Agent, or Firm* — Steven M. Greenberg, Esq.; CRGO Law

(57) ABSTRACT

This invention relates to a data comparison tool, method and computer program product for analyzing a set of data, the set of data being derived from an original set of data, comprising: comparing the derived set of data with the original set of data; generating a hyperlink to represent each difference between the derived and original data set, each difference being a changed item, an additional item, or a missing data item; providing at least one agent that is activated on selection of the hyperlink to operate on the changed, additional or missing data item; whereby a list of hyperlinks is generated to represent all the differences of the derived and original data set and selecting one of the hyperlinks will execute an agent to operate on a single data item in one of the data sets. An editor agent is provided for allowing the user to confirm or make further changes to the data item. An undo agent is provided for undoing the difference wherein a changed item is changed back, an additional item is removed and a missing item is replaced.

19 Claims, 6 Drawing Sheets

METHOD AND APPARATUS FOR COMPARING PROCESS DESIGNS

CROSS-REFERENCE TO RELATED APPLICATIONS

This application is a Submission Under 35 U.S.C. §371 for U.S. National Stage Patent Application of International Application Number PCT/EP2007/056681, filed 3 Jul. 2007, and entitled METHOD AND APPARATUS FOR COMPARING PROCESS DESIGNS, which is related to and claims priority to European Patent Application Serial Number EP0614277.2, filed 19 Jul. 2006, the entirety of which are incorporated herein by reference.

This invention relates to a method and apparatus for comparing process designs. In particular this relates to a method and apparatus for comparing ETL process designs.

BACKGROUND

IBM WebSphere Data Integration Suite comprises a job design tool that is used to design data flow between stages, known within the product as "Jobs" using a graphical user interface (GUI). An example GUI window 10 produced by the job design tool is shown in FIG. 1. GUI window 10 presents stages 12 and links 14 between the stages. Stages 12 represent data sources or targets, or data processing components, all collectively known as "stages". The links 14 connect pairs of stages and represent the (one-way) flow of data between them. A link 14 has a stage 12 at either end; these ends are known as either "inputs" or "outputs" of the stage, depending on whether the stage is at the target or source end of a link 14. Data is deemed to flow along a link 14 as records, whose structure is declared via a set of "column" definitions attached to the link or, in some cases, the stage being traversed. Stages 12 and links 14 have user-assigned names, and types that are indicated via different icons.

Jobs, stages 12, links 14 and columns all have "Properties" that further define their behaviour. The job design tool allows the user to drag and drop stages 12 and links 14 onto a "canvas" that represents the overall job design; then to navigate the canvas, select a stage 12 by pointing at it, and open a properties editor that dives down into a stage's link-level inputs and outputs, and columns, to edit the various properties. In this way very complicated data flow graphs can be built up, containing several levels with large amounts of metadata.

A perennial issue for designers has been how to compare versions of a job design in a genuinely useful way. The current approach is to export a job's overall metadata as an XML representation, and use a standard XML-oriented diff tool to compare two XML documents generated from two copies of the job. The problem with this approach is that, except in trivial cases, there is insufficient context for the designer to compare the designs, and be able to distinguish between differences in structure or properties. Also, there is often unnecessary detail shown in terms of what has not been changed.

SUMMARY OF INVENTION

According to a first aspect of the present invention there is provided a method of analyzing a set of data, the set of data being derived from an original set of data, comprising: comparing the derived set of data with the original set of data; generating a hyperlink to represent each difference between the derived and original data set, each difference being a changed item, an additional item, or a missing data item; providing at least one agent that is activated on selection of the hyperlink to operate on the changed, additional or missing data item; whereby a list of hyperlinks is generated to represent all the differences of the derived and original data set and selecting one of the hyperlinks will execute an agent to operate on a single data item in one of the data sets.

According to a second aspect of the invention there is provided a data comparison tool for analyzing a set of data, the set of data being derived from an original set of data, comprising: a comparator for comparing the derived set of data with the original set of data; a link generator for generating a hyperlink to represent each difference between the derived and original data set, each difference being a changed item, an additional item, or a missing data item; and at least one agent that is activated on selection of the hyperlink to operate on the changed, additional or missing data item; whereby a list of hyperlinks is generated to represent all the differences of the derived and original data set and selecting one of the hyperlinks will execute an agent to operate on a single data item in one of the data sets.

A comparison tool has been implemented that has knowledge of the major structural components of a job design and extracts the differences between two designs as hierarchical information so that it can be presented as an expandable tree in the context of the original jobs being compared.

The differences between two designs are presented hierarchically for ease of exploration, and as the user selects items in the comparison window the relevant part of one or both job design canvases is highlighted. The nodes of the tree represent the basic structure that the user navigates to set properties (Job>Stage>Input/Output>Column). A node represents either a repeating group (e.g. stages, inputs) or a specific item at that level (i.e. name of the stage or link involved). Leaves of the tree represent property or name differences, or the addition or removal of a node. Nodes are only present if there is a change to some leaf below it—so only the parts of the jobs that differ will appear in the tree.

If the user selects a node in the comparison window that represents a stage, the stage or stages involved will be highlighted in the job design windows. If the node represents a changed stage, both stage icons are highlighted on both canvases. If it represents an added or removed stage, the stage icon is highlighted on only one canvas—that of the job where the stage exists. Furthermore, leaf items that describe any change are presented in a "hyperlink" style, so that clicking on the appropriate part of the item takes you directly to the job editor dialog that contains the property in question. The dialog may pertain to either of the two jobs being compared, depending on which hyperlink was selected. This makes it easy to look at a changed property in the context it is being used, either in the "before" version of the job, or the "after" version.

A tool to allow a user to save the comparison tree as an HTML file has also been implemented. This tool uses dynamic HTML to allow a user to expand and contract the difference tree in the same way as when looking at it via the comparison tool in the context of the job design component. The layout and appearance of the HTML is the same in both the report and the tool.

DESCRIPTION OF DRAWINGS

Embodiments of the invention will now be described, by means of example only, with reference to the accompanying drawings in which.

DESCRIPTION OF THE EMBODIMENTS

Figure 2:
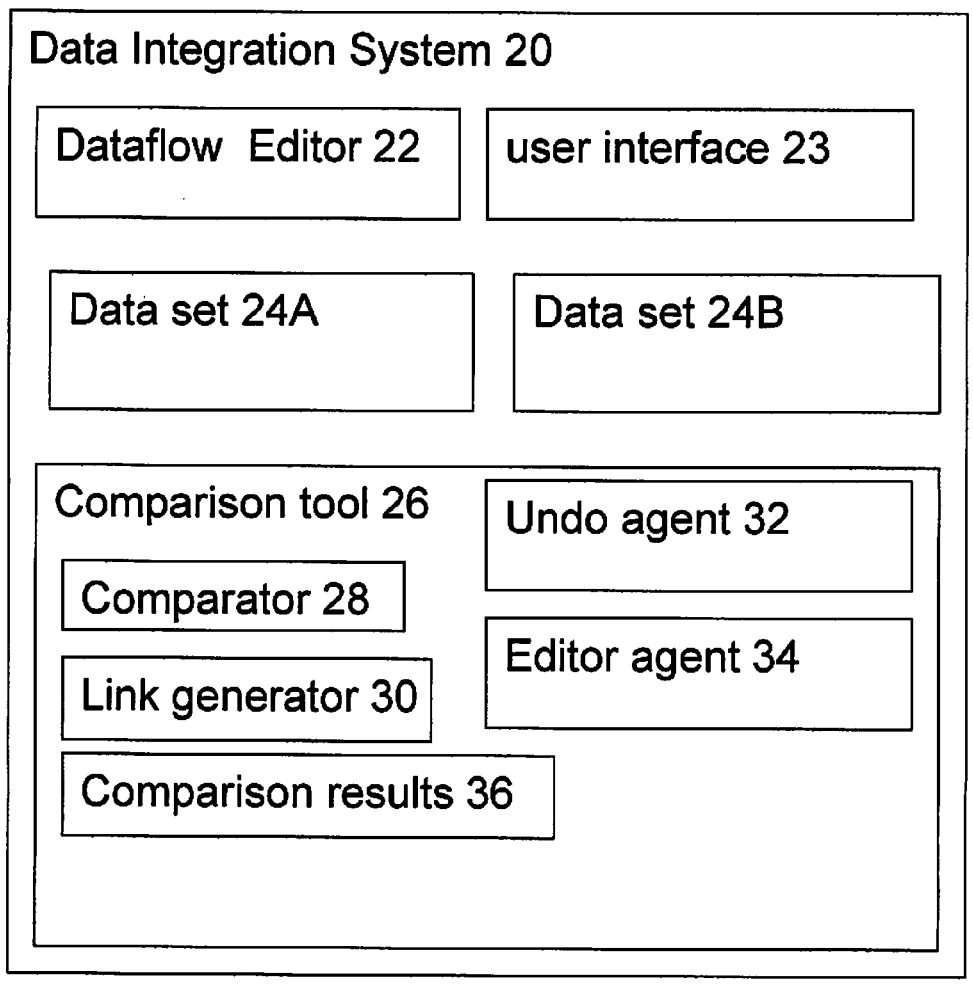
FIG. 2 is a schematic of the system of the present embodiment.

A data integration system 20 of the preferred embodiment is shown in FIG. 2. The data integration system comprises a data flow editor 22; a user interface 23; a storage for a data sets 24A and 24B; and data comparison tool 26.

The data flow editor 22 displays a selected data set and provides editing functions for the data. For instance, a user selected an original data set 24A, edits data within and saves a new derived data set 24B.

The user interface 23 provides a viewer for the data set and for comparison results of the data sets. In this embodiment the user interface uses operating system windows to display the data and comparisons.

An original data set can be created using the data flow editor and saved in memory 24A. A derived data set can be edited using data flow editor 22 and save in memory 24B.

Figure 3:
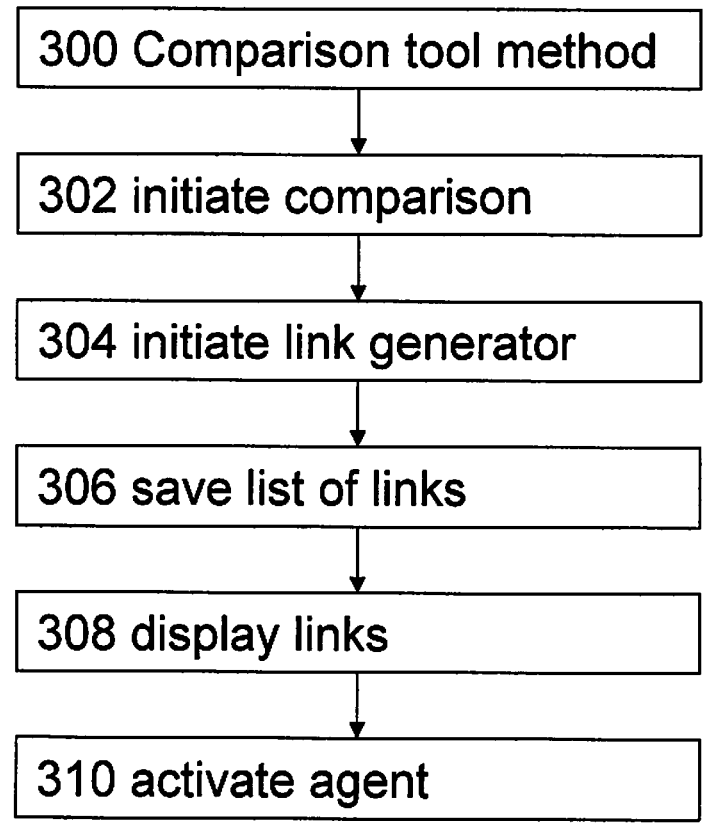
FIG. 3 is a schematic of the method of the present embodiment.

The data comparison tool 26 comprises: a comparator 28; a link generator 30; an editor agent 34; a undo agent 32; and storage 36 for comparison results. The data comparison tool 26 is controlled by method 300 shown in FIG. 3.

The comparator 28 compares a derived set of data with an original set of data.

The link generator 30 generates a hyperlink to represent each difference between the derived and original data set, each difference being a changed item, an additional item, or a missing data item. A list of hyperlinks is generated to represent all the differences of the derived and original data set and selecting one of the hyperlinks will execute an agent to operate on a single data item in one of the data sets. The hyperlink can link to an item in the derived data set which is different to a corresponding item in the original data set. The hyperlink can also link to an item in the derived data set which was added to the original data set. The hyperlink can also link to an item in the original data set that was removed in the derived data set.

The editor agent 34 allows the user to confirm or make further changes to the data item. The editor agent 34 can be a simple text editor or a special editor for that particular data item.

The undo agent 32 undoes the difference wherein a changed item is changed back, an additional item is removed and a missing item is replaced.

The comparison tool method 300 defines a sequence of steps that the tool takes once operated.

The first step 302 the comparator is prompted to compare the derived set of data with the original set of data.

The next step 304, the link generator is prompted to generate a hyperlink to represent each difference between the derived and original data set, each difference being a changed item, an additional item, or a missing data item.

In step 306, the list of hyperlinks is saved in the memory 36.

In step 308, the list is displayed using user interface 23.

In step 310 an agent is activated on selection of a hyperlink to operate on the changed, additional or missing data item. The editor agent can be activated to allow the user to confirm or make further changes to the data item. The undo agent can be activated for undoing the difference wherein a changed item is changed back, an additional item is removed and an missing item is replaced.

Some examples of how the comparison tool works follow.

Figure 1:
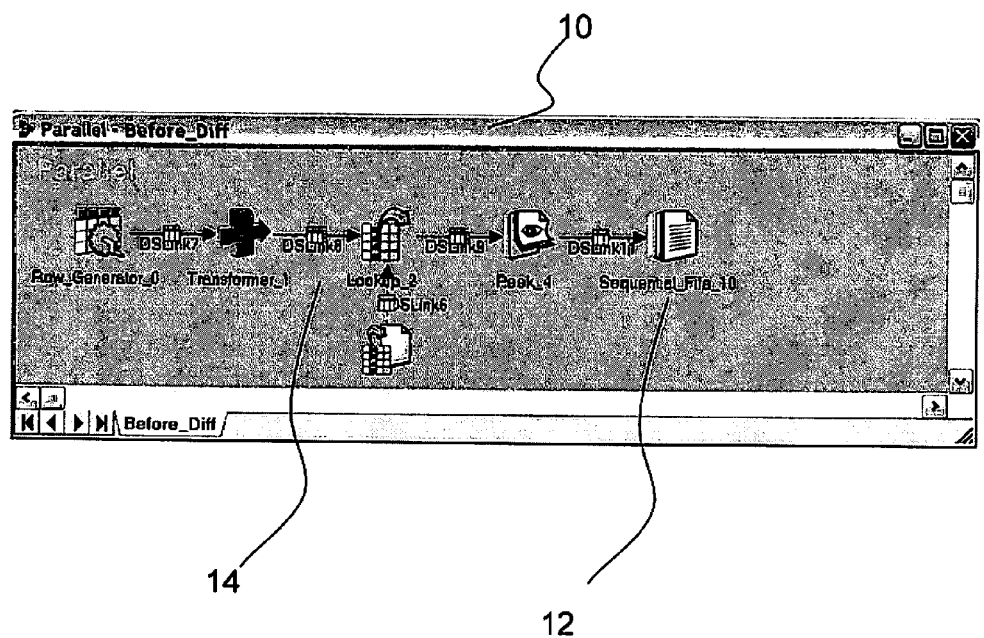
FIG. 1 is a design diagram schematic.
Figure 4:
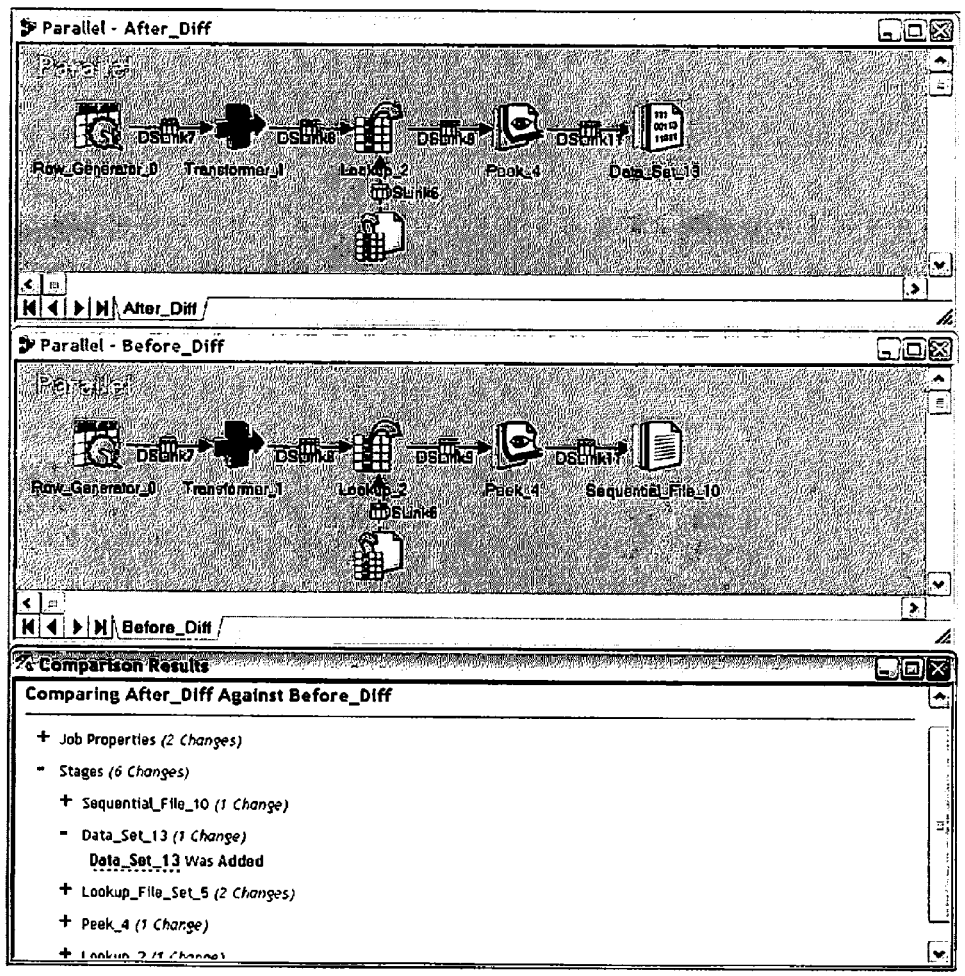
FIG. 4 is a comparison Window with a stage added.

FIG. 4 shows three windows; a job design ("Parallel") after the difference was applied; the job design before the difference was applied; and the comparison results from the tool. Using the job design from FIG. 1 as the "before" version of a job, the designer has replaced the rightmost stage, named "Sequential_File_10", with one of a different type, named "Data_Set_13". The designer has also made various lower-level changes to properties that do not appear on the canvas—to see them one would need to open up stage editor dialogs on the various stages whose names and types match between the two jobs, and try to spot the differences.

The comparison results window in FIG. 4 shows the result of running the comparison tool. The comparison tool identified which stages have been changed and added detail about each change. Note that the stages named "Row_Generator_0" and "Transformer_1" do not appear in the example comparison results window because they have identical properties and sub-structure. Expanding the node "Data_Set_13" reveals a highlighted hypertext statement with text indicating that it has been added to job "After_Diff". The hypertext "Data_Set_13" is linked to the Data_Set-13 object and clicking on the link brings up the stage editor for that stage in the job named "After_Diff".

Figure 5:
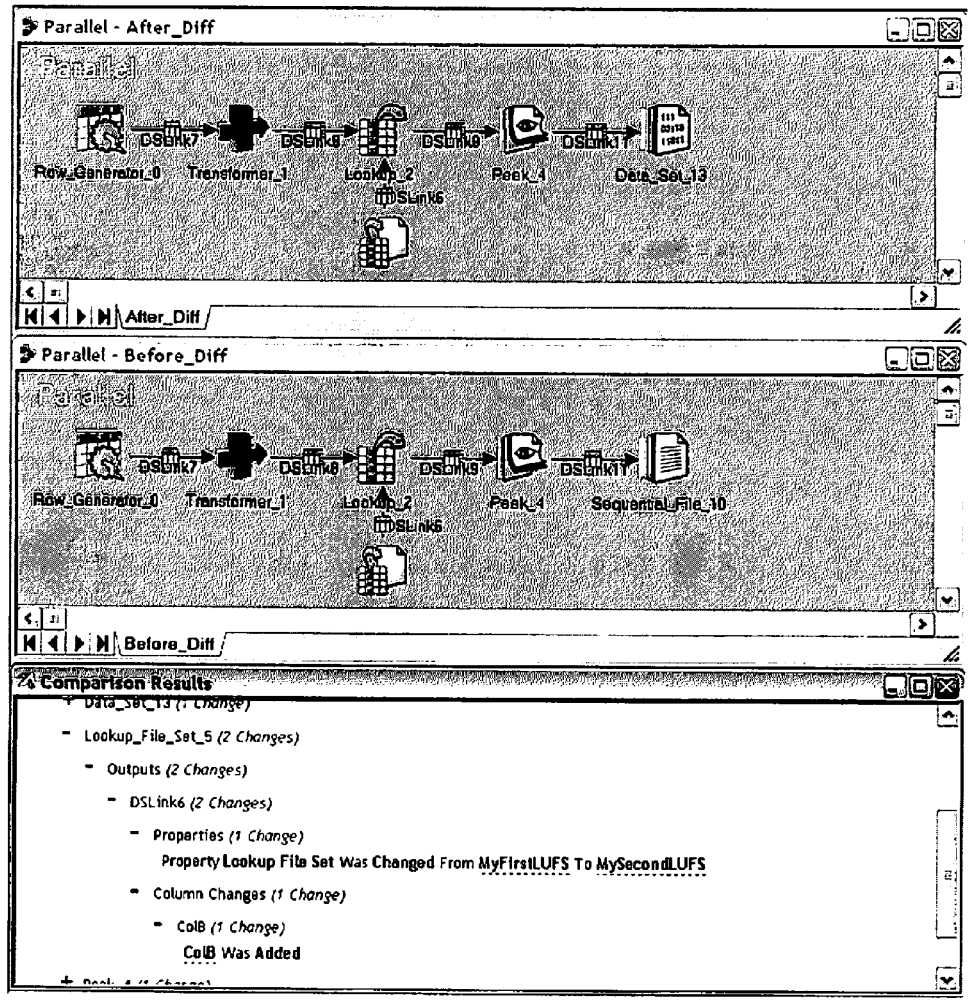
FIG. 5 is a comparison Window with a stage changed.

The next screenshot in FIG. 5 shows what happens when you expand the node labelled "Lookup_File_Set_5". This shows that there have been changes to an output of that stage, named "DSLink6". There is both a property change, the property seen by the user as hypertext "Lookup File Set" has changed its value, and a structural change, in that the column named "ColB" was added to the link. In this case the icons representing the stage "Lookup File Set" are highlighted in both canvases. Two markup statements have been added to the comparison results. A first markup statement indicates that the change is from one value to another value and comprises a hyperlink to original property field of the object in the original job; a hyperlink to the changed property field of the object in the changed job; and a hyperlink to an undo agent. Clicking on the hypertext "MyFirstLUFS" will open up the stage editor for that stage in the context of the "Before_Diff" job, since "MyFirstLUFS" was the value of the property in that job. Clicking on "MySecondLUFS" will conversely open up the stage editor in the "After_Diff" job. Clicking on "Changed" will execute the undo agent which prompts the user to undo the change in the changed job. A second markup statement indicates that the change was an addition of something and comprises a hyperlink to the added data ("ColB") and a hyperlink to an undo agent ("Added"). Clicking on "ColB" takes you into the "After_Diff" job, since that is where column "ColB" exists. Clicking on "Added" will execute the undo agent which prompts the user to undo the change in the changed job.

Figure 6:
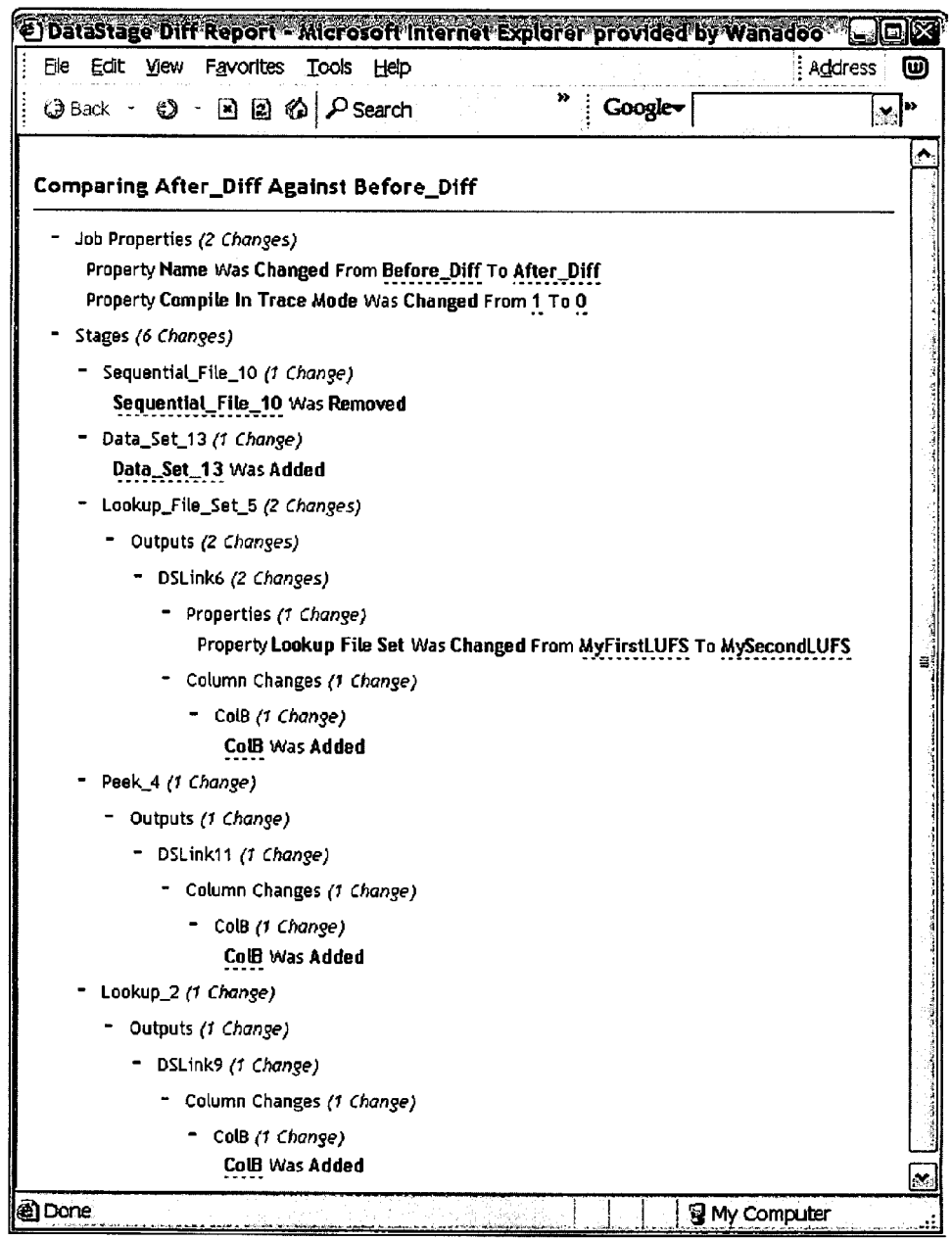
FIG. 6 is a comparison Report as HTML.

The next screenshot in FIG. 6 shows the complete output of the comparison tool for this example, saved as an HTML file and viewed in Internet Explorer, with all nodes expanded.

It will be clear to one skilled in the art that the method of the present invention may suitably be embodied in a logic apparatus comprising logic means to perform the steps of the method, and that such logic means may comprise hardware components or firmware components.

It will be equally clear to one skilled in the art that the logic arrangement of the present invention may suitably be embodied in a logic apparatus comprising logic means to perform the steps of the method, and that such logic means may comprise components such as logic gates in, for example, a programmable logic array. Such a logic arrangement may further be embodied in enabling means for temporarily or permanently establishing logical structures in such an array using, for example, a virtual hardware descriptor language, which may be stored using fixed or transmittable carrier media.

It will be appreciated that the method described above may also suitably be carried out fully or partially in software running on one or more processors (not shown), and that the software may be provided as a computer program element carried on any suitable data carrier (also not shown) such as a magnetic or optical computer disc. The channels for the transmission of data likewise may include storage media of all descriptions as well as signal carrying media, such as wired or wireless signal media.

The present invention may suitably be embodied as a computer program product for use with a computer system. Such an implementation may comprise a series of computer readable instructions either fixed on a tangible medium, such as a computer readable medium, for example, diskette, CD-ROM, ROM, or hard disk. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

It will be further appreciated that embodiments of the present invention may be provided in the form of a service deployed on behalf of a customer to offer service on demand.

It will also be appreciated that various further modifications to the preferred embodiment described above will be apparent to a person of ordinary skill in the art.

The invention claimed is:

1. A method of analysing a set of data, the set of data being derived from an original set of data, comprising:
    comparing the derived set of data with the original set of data;
    generating a markup language statement for each change, addition, and removal of a data item in the derived set of data;
    generating two or more hyperlinks in each markup language statement, at least one of the two or more hyperlinks being represented by a word identifying a type of difference;
    providing an agent that is activated upon selection of one of the two or more hyperlinks to operate on the changed, added or removed data item; and
    displaying a comparison result including all generated markup statements as an expandable tree.

2. The method according to claim 1, wherein providing the agent comprises providing an editor agent for allowing the user to confirm or make further changes to the data item.

3. The method according to claim 1, wherein providing the agent comprises providing an undo agent for undoing the difference wherein a changed item is changed back, an added item is removed and a removed item is added back.

4. The method according to claim 1, wherein at least one of the two or more hyperlinks links to an item in the derived data set which is different from a corresponding item in the original data set.

5. The method according to claim 1, wherein at least one of the two or more hyperlinks links to an item in the derived data set which was added to the original data set.

6. The method according to claim 1, wherein at least one of the two or more hyperlinks links to an item in the original data set that was removed in the derived data set.

7. A data processing system including a data comparison tool for analysing a set of data, the set of data being derived from an original set of data, comprising:
    a processor configured to:
        compare the derived set of data with the original set of data;
        generate a markup language statement for each change, addition, and
    removal of a data item in the derived set of data;
        generate two or more hyperlinks in each markup language statement, at least one of the two or more hyperlinks being represented by a word identifying a type of difference;
        provide an agent that is activated upon selection of one of the two or more hyperlinks to operate on the changed, added or removed data item; and
        display a comparison result including all generated markup statements as an expandable tree.

8. The tool according to claim 7, wherein the processor configured to provide the agent comprises providing an editor agent for allowing the user to confirm or make further changes to the data item.

9. The tool according to claim 7, wherein the processor configured to provide the agent comprises providing an undo agent for undoing the difference wherein a changed item is changed back, an added item is removed and a removed item is added back.

10. The tool according to claim 7, wherein at least one of the two or more hyperlinks links to an item in the derived data set which is different from a corresponding item in the original data set.

11. The tool according to claim 7, wherein at least one of the two or more hyperlinks links to an item in the derived data set which was added to the original data set.

12. The tool according to claim 7, wherein at least one of the two or more hyperlinks links to an item in the original data set that was removed in the derived data set.

13. A computer program product comprising a non-transitory computer readable recording medium having computer readable code stored thereon for analysing a set of data, the set of data being derived from an original set of data, said computer readable code which when loaded onto a computer system and executed performs the following steps:
    comparing the derived set of data with the original set of data;
    generating a markup language statement for each change, addition, and removal of a data item in the derived set of data;

generating two or more hyperlinks in each markup language statement, at least one of the two or more hyperlinks being represented by a word identifying a type of difference;

providing an agent that is activated upon selection of one of the two or more hyperlinks to operate on the changed, added or removed data item; and displaying a comparison result including all generated markup statements as an expandable tree.

14. The computer program product according to claim 13, wherein the computer readable code for providing the agent comprises computer readable code for providing an editor agent for allowing the user to confirm or make further changes to the data item.

15. The computer program product according to claim 13, wherein the computer readable code for providing the agent comprises computer readable code for providing an undo agent for undoing the difference wherein a changed item is changed back, an added item is removed and a removed item is added back.

16. The computer program product according to claim 13, wherein at least one of the two or more hyperlinks links to an item in the derived data set which is different from a corresponding item in the original data set.

17. The computer program product according to claim 13, wherein at least one of the two or more hyperlinks links to an item in the derived data set which was added to the original data set.

18. The computer program product according to claim 13, wherein at least one of the two or more hyperlinks links to an item in the original data set that was removed in the derived data set.

19. The method of claim 1, wherein the word identifying the type of difference includes one of changed, added, and removed.

* * * * *